United States Patent
Sankaran

(10) Patent No.: US 7,817,636 B2
(45) Date of Patent: Oct. 19, 2010

(54) OBTAINING INFORMATION ON FORWARDING DECISIONS FOR A PACKET FLOW

(75) Inventor: Ganesh Chennimalai Sankaran, Kanchipuram Dist (IN)

(73) Assignee: Cisco Technology, Inc., San Jose, CA (US)

(*) Notice: Subject to any disclaimer, the term of this patent is extended or adjusted under 35 U.S.C. 154(b) by 189 days.

(21) Appl. No.: 12/054,287

(22) Filed: Mar. 24, 2008

(65) Prior Publication Data

US 2009/0190591 A1 Jul. 30, 2009

(30) Foreign Application Priority Data

Jan. 30, 2008 (IN) .......................... 257/DEL/2008

(51) Int. Cl.
*H04L 12/56* (2006.01)
(52) U.S. Cl. .................. 370/392; 370/389; 370/394; 370/352; 709/218; 709/235; 709/239
(58) Field of Classification Search ........... 370/256, 370/389, 394, 238, 252, 253, 351, 352, 356; 709/248, 238, 239, 217, 218, 235; 379/222, 379/240, 255, 302
See application file for complete search history.

(56) References Cited

U.S. PATENT DOCUMENTS

| | | | |
|---|---|---|---|
| 6,055,575 | A | 4/2000 | Paulsen et al. |
| 6,115,378 | A | 9/2000 | Hendel et al. |
| 6,125,391 | A | 9/2000 | Meltzer et al. |
| 6,226,675 | B1 | 5/2001 | Meltzer et al. |
| 6,272,341 | B1 | 8/2001 | Threadgill et al. |
| 6,321,264 | B1 | 11/2001 | Fletcher et al. |
| 6,337,856 | B1 | 1/2002 | Schanhals et al. |
| 6,411,806 | B1 | 6/2002 | Garner et al. |

(Continued)

FOREIGN PATENT DOCUMENTS

EP 1217804 2/2002

(Continued)

OTHER PUBLICATIONS

E. Rosen et al., "BGP/MPLS VPNs," Mar. 1999, pp. 1-25.

(Continued)

*Primary Examiner*—Pankaj Kumar
*Assistant Examiner*—Anez Ebrahim
(74) *Attorney, Agent, or Firm*—Hickman Palermo Truong & Becker LLP

(57) ABSTRACT

In one embodiment, an apparatus comprises one or more forwarding logic components and logic coupled to a plurality of network interfaces. The logic is operable to: receive address information that identifies a packet flow; generate a synthetic packet based on the address information; provide the synthetic packet to the one or more forwarding logic components; retrieve forwarding information that indicates one or more forwarding decisions for the synthetic packet made by the one or more forwarding logic components; and report the forwarding information. Each of the one or more forwarding logic components is operable to make a forwarding decision for the synthetic packet as part of processing packets in the packet flow, and to store, as part of the forwarding information, data indicating the forwarding decision for the synthetic packet that is made by that forwarding logic component.

26 Claims, 5 Drawing Sheets

U.S. PATENT DOCUMENTS

| | | |
|---|---|---|
| 6,418,472 B1 | 7/2002 | Mi et al. |
| 6,473,863 B1 | 10/2002 | Genty et al. |
| 6,502,135 B1 | 12/2002 | Munger et al. |
| 6,529,513 B1 | 3/2003 | Howard et al. |
| 6,539,483 B1 | 3/2003 | Harrison et al. |
| 6,611,526 B1 | 8/2003 | Chinnaswamy et al. |
| 6,611,863 B1 | 8/2003 | Banginwar |
| 6,614,791 B1 | 9/2003 | Luciani et al. |
| 6,664,978 B1 | 12/2003 | Kekic et al. |
| 6,683,881 B1 | 1/2004 | Mijares et al. |
| 6,693,878 B1 | 2/2004 | Daruwalla et al. |
| 6,765,900 B2 | 7/2004 | Peirce, Jr. et al. |
| 6,771,646 B1 | 8/2004 | Sarkissian et al. |
| 6,772,211 B2 | 8/2004 | Lu et al. |
| 6,772,226 B1 | 8/2004 | Bommareddy et al. |
| 6,785,728 B1 | 8/2004 | Schneider et al. |
| 6,813,690 B1 | 11/2004 | Lango et al. |
| 6,862,270 B1 | 3/2005 | Ho |
| 6,868,426 B1 | 3/2005 | Mankoff |
| 6,944,183 B1 | 9/2005 | Iyer et al. |
| 6,944,678 B2 | 9/2005 | Lu et al. |
| 6,950,822 B1 | 9/2005 | Idicula et al. |
| 7,031,314 B2 | 4/2006 | Craig et al. |
| 7,058,973 B1 | 6/2006 | Sultan |
| 7,134,075 B2 | 11/2006 | Hind et al. |
| 7,185,365 B2 | 2/2007 | Tang et al. |
| 7,215,637 B1 | 5/2007 | Ferguson et al. |
| 7,245,620 B2 | 7/2007 | Shankar |
| 7,321,556 B1 | 1/2008 | Parekh et al. |
| 7,362,763 B2 | 4/2008 | Wybenga et al. |
| 7,415,512 B1 | 8/2008 | Moon |
| 7,469,300 B2 | 12/2008 | De Bonet et al. |
| 7,475,108 B2 | 1/2009 | Di Giulio et al. |
| 7,483,421 B2 | 1/2009 | Compton |
| 7,496,750 B2 | 2/2009 | Kumar et al. |
| 7,509,431 B2 | 3/2009 | Singhal et al. |
| 7,551,567 B2 | 6/2009 | Anthias et al. |
| 7,606,267 B2 | 10/2009 | Anthias et al. |
| 7,664,879 B2 | 2/2010 | Chan et al. |
| 2001/0008525 A1 | 7/2001 | Piepkorn et al. |
| 2001/0047422 A1 | 11/2001 | McTernan et al. |
| 2002/0032871 A1* | 3/2002 | Malan et al. ............ 713/201 |
| 2002/0069279 A1 | 6/2002 | Romero et al. |
| 2002/0080819 A1 | 6/2002 | Tsao |
| 2002/0083817 A1 | 7/2002 | Hoshino |
| 2002/0105911 A1 | 8/2002 | Pruthi et al. |
| 2002/0107951 A1 | 8/2002 | Teague et al. |
| 2002/0114274 A1 | 8/2002 | Sturges et al. |
| 2002/0124066 A1 | 9/2002 | Chang et al. |
| 2002/0133618 A1 | 9/2002 | Desai et al. |
| 2002/0143981 A1 | 10/2002 | DeLima et al. |
| 2002/0163933 A1 | 11/2002 | Benveniste |
| 2002/0165957 A1 | 11/2002 | Devoe et al. |
| 2002/0191622 A1 | 12/2002 | Zdan |
| 2003/0005117 A1 | 1/2003 | Kang et al. |
| 2003/0018726 A1 | 1/2003 | Low et al. |
| 2003/0026268 A1 | 2/2003 | Navas |
| 2003/0028616 A1 | 2/2003 | Aoki et al. |
| 2003/0036879 A1 | 2/2003 | Sagar |
| 2003/0055818 A1 | 3/2003 | Faybishenko et al. |
| 2003/0069975 A1 | 4/2003 | Abjanic et al. |
| 2003/0078031 A1 | 4/2003 | Masuda |
| 2003/0086422 A1* | 5/2003 | Klinker et al. ............ 370/389 |
| 2003/0093530 A1 | 5/2003 | Syed |
| 2003/0095569 A1 | 5/2003 | Wengrovitz et al. |
| 2003/0099232 A1* | 5/2003 | Kudou et al. ............ 370/389 |
| 2003/0108041 A1 | 6/2003 | Aysan et al. |
| 2003/0112809 A1 | 6/2003 | Bharali et al. |
| 2003/0115448 A1 | 6/2003 | Bouchard |
| 2003/0140140 A1 | 7/2003 | Lahtinen |
| 2003/0158962 A1 | 8/2003 | Keane et al. |
| 2003/0163539 A1 | 8/2003 | Piccinelli |
| 2003/0163603 A1 | 8/2003 | Fry et al. |
| 2003/0177183 A1 | 9/2003 | Cabrera et al. |
| 2003/0188192 A1 | 10/2003 | Tang et al. |
| 2003/0189935 A1 | 10/2003 | Warden et al. |
| 2003/0204626 A1 | 10/2003 | Wheeler |
| 2003/0204719 A1 | 10/2003 | Ben-Itzhak |
| 2003/0217171 A1 | 11/2003 | Von Stuermer et al. |
| 2003/0217176 A1 | 11/2003 | Beunings |
| 2003/0236883 A1 | 12/2003 | Takeshima et al. |
| 2004/0006613 A1 | 1/2004 | Lemieux et al. |
| 2004/0022250 A1 | 2/2004 | Chen et al. |
| 2004/0022255 A1 | 2/2004 | Chen et al. |
| 2004/0024881 A1 | 2/2004 | Elving et al. |
| 2004/0032881 A1 | 2/2004 | Arai |
| 2004/0039940 A1 | 2/2004 | Cox et al. |
| 2004/0064581 A1* | 4/2004 | Shitama et al. ............ 709/238 |
| 2004/0128360 A1 | 7/2004 | Petri et al. |
| 2004/0162871 A1 | 8/2004 | Pabla et al. |
| 2004/0167986 A1 | 8/2004 | Gilfix et al. |
| 2004/0205336 A1 | 10/2004 | Kessler et al. |
| 2004/0264481 A1 | 12/2004 | Darling et al. |
| 2004/0267920 A1 | 12/2004 | Hydrie et al. |
| 2004/0267930 A1 | 12/2004 | Giulio et al. |
| 2004/0267933 A1 | 12/2004 | Przybylski et al. |
| 2004/0268357 A1 | 12/2004 | Joy et al. |
| 2005/0005031 A1 | 1/2005 | Gordy et al. |
| 2005/0015619 A1 | 1/2005 | Lee |
| 2005/0041670 A1 | 2/2005 | Lin et al. |
| 2005/0050362 A1 | 3/2005 | Peles |
| 2005/0054346 A1 | 3/2005 | Windham et al. |
| 2005/0063377 A1 | 3/2005 | Bryant et al. |
| 2005/0076332 A1 | 4/2005 | Jawaharlal et al. |
| 2005/0080914 A1 | 4/2005 | Lerner et al. |
| 2005/0086342 A1 | 4/2005 | Burt et al. |
| 2005/0094611 A1 | 5/2005 | Cheong et al. |
| 2005/0114394 A1 | 5/2005 | Kaipa et al. |
| 2005/0117576 A1 | 6/2005 | McDysan et al. |
| 2005/0148314 A1 | 7/2005 | Taglienti et al. |
| 2005/0165834 A1* | 7/2005 | Nadeau et al. .......... 707/103 R |
| 2005/0169171 A1 | 8/2005 | Cheng et al. |
| 2005/0190758 A1* | 9/2005 | Gai et al. ............ 370/389 |
| 2005/0198351 A1 | 9/2005 | Nog et al. |
| 2005/0213591 A1 | 9/2005 | Nakazawa et al. |
| 2005/0283539 A1 | 12/2005 | Betts et al. |
| 2005/0289538 A1 | 12/2005 | Black-Ziegelbein et al. |
| 2006/0007929 A1 | 1/2006 | Desai et al. |
| 2006/0015699 A1 | 1/2006 | Fujiwara et al. |
| 2006/0021010 A1 | 1/2006 | Atkins et al. |
| 2006/0031374 A1 | 2/2006 | Lu et al. |
| 2006/0106941 A1 | 5/2006 | Singhal et al. |
| 2006/0123425 A1 | 6/2006 | Ramarao et al. |
| 2006/0123467 A1 | 6/2006 | Kumar et al. |
| 2006/0123477 A1 | 6/2006 | Raghavan et al. |
| 2006/0123479 A1 | 6/2006 | Kumar et al. |
| 2006/0129650 A1 | 6/2006 | Anthias et al. |
| 2006/0129689 A1 | 6/2006 | Ho et al. |
| 2006/0155969 A1 | 7/2006 | Yoda et al. |
| 2006/0168334 A1 | 7/2006 | Potti et al. |
| 2006/0256768 A1 | 11/2006 | Chan |
| 2006/0288208 A1* | 12/2006 | Dashora et al. ............ 713/167 |
| 2007/0005786 A1 | 1/2007 | Kumar et al. |
| 2007/0005801 A1 | 1/2007 | Kumar et al. |
| 2007/0011223 A1 | 1/2007 | Calvignac et al. |
| 2007/0028001 A1 | 2/2007 | Phillips et al. |
| 2007/0055864 A1 | 3/2007 | Tock et al. |
| 2007/0112975 A1* | 5/2007 | Cassar ............ 709/239 |
| 2007/0156919 A1 | 7/2007 | Potti et al. |
| 2007/0253346 A1* | 11/2007 | Nguyen et al. ............ 370/256 |

2008/0025230 A1    1/2008    Patel et al.

FOREIGN PATENT DOCUMENTS

| WO | WO 99/07116 | 2/1999 |
|---|---|---|
| WO | WO 02/27507 | 4/2002 |
| WO | WO 03/021465 A1 | 3/2003 |

OTHER PUBLICATIONS

Yakov Rekhter et al., "Use of PE-PE GRE or IP in RFC2547 VPNs," Expiration Date: Aug. 2002, pp. 1-6.

Harrington, D. et al., "An Architecture for Describing SNMP Management Frameworks", RFC 2571, Apr. 1999, pp. 1-58.

Wijnen, B. et al., View-based Access Control Model (VACM) for the Simple Network Management Protocol (SNMP), RCF 2575, Apr. 1999, pp. 1-36.

International Searching Authority, "Notification of Transmittal of the International Search Report and the Written Opinion of the International Searching Authority, or the Declaration," PCT/US2006/024375, dated Oct. 17, 2006, 10 pages.

Current Claims, PCT/US2006/024375, 6 pages.

Decasper, Dan et al., "Router Plugins: A Software Architecture for Next-Generation Routers," IEEE ACM Transactions on Networking, vol. 9, No. 1, Feb. 2000, XP011038838, 14 pages.

International Searching Authority, "Notification of Transmittal of the International Search Report and the Written Opinion of the International Searching Authority, or the Declaration", International application No. PCT/US05/46149, dated Jul. 20, 2007, 9 pages.

Claims, International application No. PCT/US05/46149, 10 pages.

State Intellectual Property Office of the People's Republic of China, "The First Office Action", application No. 200580031604.1, Dated Jun. 27, 2008, 15 pages.

Claims, application No. 200580031604.1, 6 pages.

The Patent Office of the People's Republic of China, "The Second Office Action", Application No. 200580045932.7, dated May 8, 2009, 9 pages.

Pending Claims, Application No. 200580045932.7, 8 pages.

European Patent Office, "Communication pursuant to Article 94(3) EPC", Application No. 05820894.3.2211/1812870, dated May 28, 2009, 9 pages.

Amended Claims, Application No. 05820894.3.2211/1812870, 6 pages.

Chiu, Kenneth, et al., "Investigating the Limits of SOAP Performance for Scientific Computing", Nov. 7, 2002, IEEE Computer Society, 8 pages.

State Intellectual Property Office of the People'S Republic of China, "The First Office Action", filing No. 200580031571.0, Dated Dec. 19, 2008, 9 pages.

Claims, filing No. 200580031571.0, 8 pages.

State Intellectual Property Office of the People'S Republic of China, "The First Office Action", filing No. 200580045932.7, Dated Nov. 28, 2008, 8 pages.

Claims, filing No. 200580045932.7, 8 pages.

European Patent Office, "European Search Report", application No. EP 05820894, Feb. 6, 2009, 8 pages.

Claims, application No. EP 05820894, 6 pages.

* cited by examiner

OBTAINING INFORMATION ON FORWARDING DECISIONS FOR A PACKET FLOW

PRIORITY CLAIM

This application claims the benefit of priority under 35 U.S.C. §119 from India Patent Application No. 257/DEL/2008, entitled "OBTAINING INFORMATION ON FORWARDING DECISIONS FOR A PACKET FLOW," filed by Ganesh Chennimalai Sankaran on Jan. 30, 2008, the entire contents of which is hereby incorporated by reference for all purposes as if fully set forth herein.

TECHNICAL FIELD

The present disclosure relates generally to network communications.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Traditionally, it has been difficult to diagnose problems with paths in a packet-switched network, in which each of multiple network infrastructure elements (e.g., routers) makes forwarding decisions for network packets that traverse the paths. The approaches currently being used to determine whether a router correctly forwards packets provide for sending one or more network packets to the router and receiving from the router return packets that carry information indicating any problems. For example, one approach provides for using various Internet Control Message Protocol (ICMP) mechanisms, such as, for example, the tracert (trace route) utility provided on the Windows® family of operating systems. In general, the ICMP-based mechanisms provide for sending a control packet from a source to a destination and for monitoring ICMP messages in return network packets that are generated by any router(s) that cannot for whatever reason forward the control packet to the destination. One disadvantage of the ICMP-based mechanisms is that a network management station can trace the path from source A to destination B only if the network management station is on the same subnet as source A.

Another approach for diagnosing network path problems uses the source routing option provided by the various versions of the Internet Protocol (IP). The IP source routing option allows the originator of a network packet to specify what path through the network that packet will take and what path would be taken by any return packets. In this approach, a network packet with the IP source routing option is sent to a particular destination over a particular path; the information included in any return packets would be then inspected to diagnose any forwarding problems on that particular path. One disadvantage of this approach is that processing of network packets with the IP source routing option is disabled in the routers of most packet-switched networks because this option poses a security risk and because unique Reverse Path Forwarding (uRPF), which is used in secure networks, fails for network packets with that option.

A common disadvantage of the above approaches is that, while these approaches may identify a router that causes a problem on a particular network path, these approaches do not provide detailed enough information to determine exactly what in that router causes the problem. For example, these approaches cannot provide sufficient information about the forwarding decisions for packets that are forwarded by using Policy-Based Routing (PBR) and/or Multi-Topology Routing (MTR). When PBR and/or MTR are configured in a router, the router makes forwarding decisions not only on IP information but also based on information from protocols in the layers of the communication stack that are different than the network layer (e.g., data link layer, transport layer, application layer, etc). However, the above approaches for diagnosing network path problems can only provide information from network layer protocols (e.g., IP information) but cannot provide information from protocols at other communication stack layers.

BRIEF DESCRIPTION OF THE DRAWINGS

Obtaining information on forwarding decisions for packet flows is illustrated by way of example, and not by way of limitation, in the figures of the accompanying drawings and in which like reference numerals refer to similar elements and in which.

DESCRIPTION OF EXAMPLE EMBODIMENTS

Figure 1:
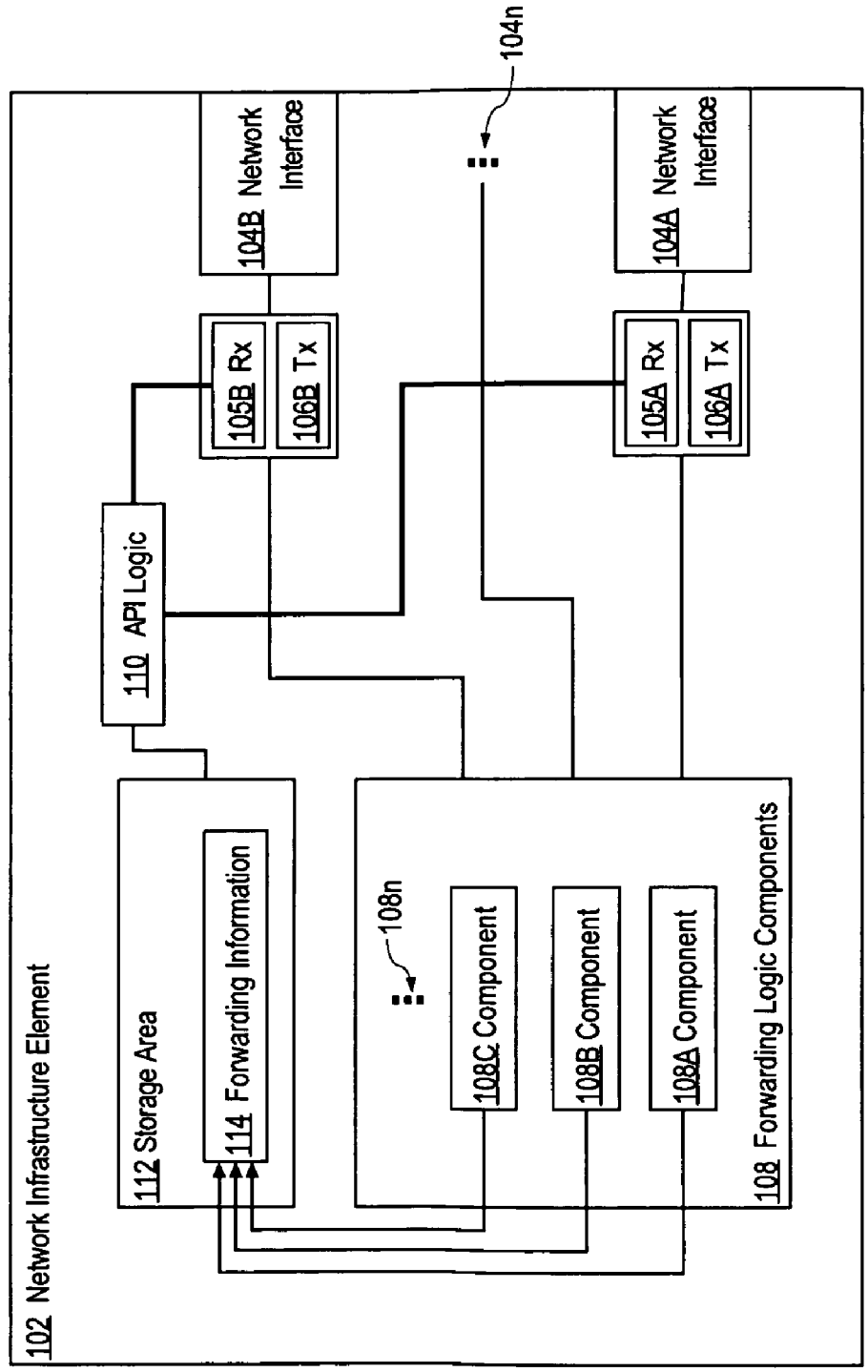
FIG. 1 illustrates an example network infrastructure element according to one embodiment.

Techniques for obtaining information on forwarding decisions for packet flows are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Address Information as Logic Input
    3.0 Forwarding Information as Logic Output
    4.0 Example Embodiment Using Synthetic Packets
        4.1 Structural Details
        4.2 Functional Details
    5.0 Example Embodiment Using API Logic
        5.1 Structural Details
        5.2 Functional Details
    6.0 Implementation Mechanisms—Hardware Overview
    7.0 Extensions and Alternatives

1.0 General Overview

Obtaining information on forwarding decisions for packet flows is described. In one embodiment, an apparatus comprises a plurality of network interfaces, one or more forwarding logic components coupled to the plurality of network interfaces, and logic coupled to the plurality of network interfaces. The plurality of network interfaces are operable to communicatively connect to one or more packet-switched networks. The logic is encoded in one or more tangible media and is operable to: receive address information that identifies a packet flow, where the packet flow is received at an incoming network interface and is to be forwarded through an outgoing network interface; generate a synthetic packet based on the address information, where the synthetic packet includes header data indicating that the synthetic packet is not to be forwarded to any next-hop network element; provide the synthetic packet to the one or more forwarding logic components; retrieve forwarding information that indicates one or more forwarding decisions for the synthetic packet made by the one or more forwarding logic components; and report the forwarding information. The one or more forwarding logic components are encoded in one or more tangible media and are operable to receive packet flows and to forward the packet flows. In addition, each forwarding logic component is operable to: make a forwarding decision for the synthetic packet as part of processing packets in the packet flow; and store, as part of the forwarding information, data indicating the forwarding decision for the synthetic packet that is made by that forwarding logic component.

In one embodiment, an apparatus comprises a plurality of network interfaces, one or more forwarding logic components coupled to the plurality of network interfaces, and logic coupled to the plurality of network interfaces. The plurality of network interfaces are operable to communicatively connect to one or more packet-switched networks. The one or more forwarding logic components are encoded in one or more tangible media and are operable to receive packet flows and to forward the packet flows. The logic is encoded in one or more tangible media and is operable to: receive address information that identifies a packet flow, where the packet flow is received at an incoming network interface and is to be forwarded through an outgoing network interface; based on the address information, determine one or more forwarding decisions that would be respectively made by the one or more forwarding logic components for packets in the packet flow; store the one or more forwarding decisions as part of forwarding information associated with the packet flow; and report the forwarding information.

Other embodiments comprise a method and computer-readable media encoded with logic for obtaining information on forwarding decisions for packet flows according to the techniques described herein.

In some embodiments, the techniques for obtaining information on forwarding decisions for packet flows described herein may be implemented by a computer system that is coupled as a blade to the backplane of a network infrastructure element, such as a router or switch, that is configured for forwarding network traffic in a packet-switched network. In some embodiments, the techniques described herein may be implemented using one or more computer programs executing under the control of the Operating System (OS) of a network infrastructure element, such as a router or switch. In various embodiments, the techniques described herein may be implemented as one or more software components that are executable by one or more processors, as one or more hardware components such Application-Specific Integrated Circuits (ASICs), or as any combination of one or more software and hardware components. For this reason, the embodiments described herein are to be regarded in an illustrative rather than a restrictive sense.

2.0 Address Information as Logic Input

The techniques described herein for obtaining information on forwarding decisions for packet flows provide for logic that is executable at a network infrastructure element. The logic is operable to receive as input address information that identifies a packet flow and to provide as output forwarding information that includes the forwarding decisions that are made or would be made by the network infrastructure element for packets in that packet flow.

As used herein, "network infrastructure element" (also referred to hereinafter as "network element") refers to a networking device that is operable to manage network traffic transmitted in one or more networks. Typically, a network element is operable to receive packets on network interfaces communicatively connected to other network elements, make a routing or forwarding decision regarding the received packets, and transmit the received packets on the network interfaces based on the forwarding decision. Examples of network elements include, but are not limited to, routers, switches, bridges, and hubs.

As used herein, "packet flow" refers to a sequence of packets that are sent from a particular source to a particular destination. The packets in a packet flow may be sent from a source to a destination over a variety of protocols including, but not limited to, Layer 2 data link protocols (e.g., Frame Relay protocol), Layer 3 network protocols (e.g., the Internet Protocol (IP)), and a variety of other protocols that may be tunneled over an IP protocol (e.g., protocols that are supported by a Multi-Protocol Label Switching (MPLS) architecture). Further, the packets in a packet flow may carry data units of one or more Layer 4-Layer 7 protocols including, but not limited to, transport layer protocols (e.g., Transmission Control Protocol (TCP) and User Datagram Protocol (UDP)), and application layer protocols (e.g., Hypertext Transfer Protocol (HTTP) and Simple Network Management Protocol (SNMP)).

The techniques described herein provide for logic that is operable to receive address information that identifies a packet flow. As used herein, "address information" refers to a set of data that collectively identifies a packet flow that is sent from a particular source to a particular destination. In various embodiments, the logic at a network element may receive through various mechanisms address information that identifies packet flows processed by the network element. Examples of such mechanisms include, without limitation, Command Line Interface (CLI) commands submitted by a user logged in at the network element and SNMP messages that are sent from SNMP management stations to an SNMP agent executing on the network element. In addition, in various embodiments the logic may respond to user requests submitting address information as well as to requests with address information sent by automatic diagnostic utilities. The techniques described herein are not in any way limited to receiving address information identifying packet flows from any particular type of entity or through any particular type of mechanism, logic, module or component.

The techniques described herein may be implemented for address information that includes any type of data that is used by a network element to make a forwarding decision for the packets in a packet flow. The logic of a network element that is configured to implement the techniques described herein may process address information that includes data from any Layer 2-Layer 7 protocol fields that are used by the network element to make forwarding decisions for packets in a packet flow. For example, the data from the Layer 2-Layer 7 protocol fields may include one or more protocol options for one or more Layer 2-Layer 7 protocols over which the packets in the packet flow are routed and forwarded in the network.

In some embodiments, the address information that identifies a packet flow may include a source address and a destination address. For example, the address information may include an IP address of a source (which originates a packet flow) and an IP address of a destination (which is the recipient of the packets in the packet flow). By identifying a packet flow through source and destination addresses, in these embodiments the techniques described herein provide for diagnosing whether a network element correctly forwards packets of the packet flow at the network protocol layer, such as, for example, the packet flow sent from one network element in a packet-switched network to another.

In addition to source and destination addresses, in some embodiments the address information that identifies a packet flow may also include an identifier of a Layer 4 protocol associated with the packets in the packet flow. Further, in these embodiments the address information may also include a source port and a destination port associated with the packet flow. For example, the address information may include data indicating that the packets in the packet flow carry TCP segments. In another example, the address information may include data indicating that the packets in the packet flow carry UDP datagrams. Further, the address information may include data that specifies the port number on which the packet flow originates at the source and data that specifies the port number on which the packet flow is received at the destination. By identifying a packet flow through source and destination addresses and ports and through a Layer 4 protocol, in these embodiments the techniques described herein provide for diagnosing whether a network element correctly forwards the packets of a packet flow that carries data for a Layer 4 protocol, such as, for example, a packet flow that carries TCP session segments that are sent from a source to a destination.

In some embodiments, the address information that identifies a packet flow may include an application protocol identifier. For example, the address information may include data that indicates that the packets of a packet flow carry HTTP requests/responses. By identifying a packet flow through an application protocol identifier, in these embodiments the techniques described herein provide for diagnosing whether a network element correctly forwards the packets of a packet flow that carries application-level data, such as, for example, a packet flow that carries messages sent from a web client to a web server.

In some embodiments, the address information that identifies a packet flow may include an identifier of the incoming interface on which the packet flow is received at the network element being diagnosed. Depending on the type and architecture of the network element, the incoming interface identifier may indicate the number and type of the interface. For example, the identifier "GigabitEthernet3/16" may indicate the third of sixteen interfaces that operate over a gigabit Ethernet protocol, the identifier "EOBC0/0" may indicate an interface that operates over an Ethernet Out-of-Band channel, and the identifier "Port-channel1.2" may indicate the second logical interface of a particular EtherChannel interface that comprises multiple physical interfaces with common network address. Identifying a packet flow through an incoming network interface provides for diagnosing whether a multi-homed network element (e.g., a network element that is configured to receive packet flows from the same source on multiple incoming interfaces) correctly forwards packets received on a particular incoming interface from a particular source.

In some embodiments, the address information that identifies a packet flow may include an inbound MPLS label that identifies a next-hop destination for the packets in the packet flow. By identifying a packet flow through an inbound MPLS label, in these embodiments the techniques described herein provide for diagnosing whether a network element correctly forwards a packet flow that represents an MPLS tunnel over an IP packet-switched network.

The examples of address information described herein are provided for purely illustrative purposes, and the techniques described herein are not in any way limited to any particular type of address information that can be used to identify a packet flow. For this reason, the examples of address information provided herein are to be regarded in an illustrative rather than a restrictive sense.

3.0 Forwarding Information as Logic Output

The techniques described herein for obtaining information on forwarding decisions for packet flows provide for logic that is executable at a network element. In response to receiving address information as input, the logic is operable to return as output forwarding information that includes the forwarding decisions that are made or would be made by the network element for packets in that packet flow.

As used herein, "forwarding information" refers to a set of data which indicates one or more forwarding decisions respectively made by one or more forwarding components of a network element for packets of a particular packet flow. "Forwarding decision" refers to data indicating a result of processing a packet at a network element. Various types of forwarding decisions may be made depending on the type of forwarding implemented by a network element and the type of packet being processed and forwarded by the network element. For example, a forwarding decision made for a particular packet by a network element may include dropping the packet because the packet fails to satisfy one or more routing policies or Access Control Lists (ACLs). In another example, a forwarding decision made for a particular packet by a network element may include a Quality-of-Service (QoS) decision that determines how the particular packet is treated within the network element, such as, for example whether the particular packet is queued in high priority or low priority queues which expedite or delay transmission of the particular packet. In another example, a forwarding decision made for a particular packet by a network element may include determining a next-hop network element to which the packet is to be forwarded, where the next-hop network element is a particular network element that is the next-hop on the route to the packet destination.

In various embodiments, the logic at a network element may provide through various mechanisms the forwarding information that is determined for a particular packet flow that is processed by the network element. Examples of such mechanisms include, without limitation, a CLI provided at the network element and SNMP messages that are sent to SNMP management stations from an SNMP agent executing on the network element. In addition, in various embodiments the logic may send the forwarding information determined for a particular packet flow in response to user requests as well as in response to requests from automatic diagnostic utilities. The techniques described herein are not in any way limited to providing forwarding information to any particular type of entity or through any particular type of mechanism.

According to the techniques described herein, the logic at a network element may return forwarding information that includes any type of data representing a forwarding decision made by a network element for the packets in a packet flow. In addition, the forwarding information may include any other data that would be helpful to a user (e.g., a network administrator) and/or to an automatic diagnostic utility to determine any problems that may exist with the forwarding of the packets in the packet flow. For example, if the forwarding decision is to drop the packets in a particular packet flow, then the techniques described herein may provide for including in the forwarding information any configuration data that may indicate why the packets are being dropped; examples of such configuration data include, without limitation, Quality-of-Service (QoS) settings, policy settings of the routing policies that are not satisfied, and ACL settings of ACLs that are not satisfied.

In some embodiments, the forwarding information returned by the logic of a network element may include the network address of a next-hop network element to which the network element forwards the packets of a particular packet flow. For example, the network address may be an IP address of the next-hop network element to which the packets of the particular packet flow are sent. By providing the next-hop address for the packet flow, in these embodiments the techniques described herein provide for diagnosing whether a network element forwards packets of the packet flow to the correct next-hop network element.

In some embodiments, the forwarding information returned by the logic of a network element may include an identifier of the outgoing network interface through which the network element forwards the packets of a particular packet flow. Outgoing network interfaces in a network element are identified in a similar manner as incoming network interfaces. (The network interfaces in a network element are typically configurable for both transmitting and receiving packets; thus, the distinction between "incoming" and "outgoing" network interfaces made herein is purely illustrative, and it is noted that the same network interface may be "incoming" for some packet flows and "outgoing" for other packet flows.) By providing the identifier of the outgoing network interface, in these embodiments the techniques described herein provide for diagnosing whether a network element forwards packets of the packet flow through the correct outgoing network interface.

In some embodiments, the forwarding information returned by the logic of a network element may include the Layer 2 (e.g., data link) address of a next-hop network element to which the network element routes the packets of a particular packet flow. In addition, the forwarding information may also include an adjacency record, which associates the Layer 2 address of the next-hop network element with an identifier of the interface of the network element that is connected to that next-hop network element. (Network elements in a packet-switched network are said to be "adjacent" if they can reach each other with a single hop across a data link layer.) By providing the Layer 2 address of the next-hop network element for the packet flow and/or any corresponding adjacency records, in these embodiments the techniques described herein provide for diagnosing whether a network element forwards packets of the packet flow to the next-hop network element over the correct and/or optimal outgoing network interface.

In some embodiments, the forwarding information returned by the logic of a network element may include various metrics associated with the network route over which the network element routes the packets of a particular packet flow. Examples of network route metrics include, but are not limited to, origin metrics which identify the network element originating the network route, preference metrics which identify the degrees of preference for the network route, state metrics which identify one or more of multiple states of the network route, and cost metrics which identify costs associated with sending packets over the network route. By providing network route metrics for the packet flow, in these embodiments the techniques described herein provide for diagnosing whether a network element forwards packets of the packet flow over the correct and/or optimal network route.

In some embodiments, the forwarding information returned by the logic of a network element may include an outbound MPLS label that is swapped into packets in the packet flow, where the outbound MPLS label is used by the next-hop network element to make a forwarding decision for the packets in that packet flow. By returning the outbound MPLS label, in these embodiments the techniques described herein provide for diagnosing whether a network element correctly forwards a packet flow that represents an MPLS tunnel transferred over an IP packet-switched network.

In some embodiments, the forwarding information returned by the logic of a network element may include one or more Layer 2 tags which are used by the network element to forward the packets of a particular packet flow. A Layer 2 tag is a data value stored between the data link header (e.g., Ethernet header) and the network address header (e.g., IP header) of a network packet. A network element may use the Layer 2 tags included in a particular packet to determine to which outgoing network interface to transfer that packet. By providing the Layer 2 tags that are used to make a forwarding decision, in these embodiments the techniques described herein provide for diagnosing whether a network element forwards packets of the packet flow through the correct outgoing network interface.

In some embodiments, the forwarding information returned by the logic of a network element may include rewrite data that is used by the network element to overwrite Layer 2 and/or Layer 3 headers of the packets of a packet flow that the network element forwards. For example, the rewrite data may include any Quality-of-Service (QoS) values and/or Class-of-Service (CoS) values that are used by the network element to overwrite any corresponding values in the packets of the packet flow. By providing the rewrite data used on the packets of the packet flow, in these embodiments the techniques described herein provide for diagnosing whether a network element forwards the packets of the packet flow with the correct preference options.

The examples of forwarding information described herein are provided for purely illustrative purposes, and the techniques described herein are not in any way limited to any particular type of forwarding information that is determined and returned for a packet flow. For this reason, the examples of forwarding information provided herein are to be regarded in an illustrative rather than a restrictive sense.

4.0 Example Embodiment Using Synthetic Packets

According to the techniques described herein, in some embodiments a network element may determine the forwarding information for a packet flow by using synthetic packets.

As used herein, "synthetic packet" refers to a packet that is generated at a network element, is not received from another network element, and is not to be forwarded to another network element. According to the techniques described herein, a synthetic packet is marked as "internal" or "debug" which indicates to the packet-processing network element components that that packet is not be forwarded to any other network element and that any forwarding decisions for that packet are to be recorded. For example, a synthetic packet may include header data (e.g., one or more flags, options, etc.) indicating that: a packet-processing network element component needs to record its forwarding decision after processing the synthetic packet; and the synthetic packet is not to be forwarded to any other network element. According to the techniques described herein, the forwarding logic components of a network element process a synthetic packet like any other packet of a packet flow—for example, by examining the synthetic packet, making a forwarding decision for the synthetic packet, and facilitating the transfer of the synthetic packet from the receive queue of an incoming network interface to the transmit queue of an outgoing network interface. The synthetic packet is examined in the transmit queue of the outgoing network interface and, based on the flags in the header data, is dropped from the transmit queue prior to transmission.

In operation, according to the techniques described herein a management Application Programming Interface (API) logic of a network element receives address information that identifies a packet flow that is received at an incoming network interface of the network element. As used herein, "API logic" broadly refers to a set of components operable to perform the techniques described herein, and is not limited to any particular types of modules, interfaces, libraries, elements, or any particular types of mechanisms, services, or application programs. Based on the received address information, the API logic generates a synthetic packet. The API logic then determines the incoming network interface for the packet flow identified in the address information, and stores the synthetic packet into the receive queue of that incoming network interface. Thereafter, one or more forwarding logic components of the network element process and make forwarding decisions for the synthetic packet as part of processing the packets in the identified packet flow. When processing the synthetic packet each of the one or more forwarding logic components stores, as part of the forwarding information associated with the synthetic packet and correspondingly with the packet flow, data indicating the forwarding decision for the synthetic packet that is made by that forwarding logic component. After the forwarding logic components are finished with processing the synthetic packet, the synthetic packet would be transferred to an outgoing network interface of the network element where it will be examined and dropped based on the packet's header data. The forwarding decisions made for the synthetic packet, which are in effect the forwarding decisions made for packets of the packet flow identified in the received address information, are recorded in the forwarding information. The API logic of the network element retrieves the forwarding information and may provide this information to a user.

4.1 Structural Details

FIG. 1 illustrates an example network element that is operable to implement the techniques described herein for obtaining information on forwarding decisions for packet flows according to one embodiment.

Network element 102 comprises a plurality of network interfaces 104n and forwarding logic components 108. Ellipses 104n indicates that network element 102 may comprise any number of network interfaces, such as network interfaces 104A and 104B. Network interface 104A comprises (or is operatively coupled to) receive queue 105A and transmit queue 106A, where receive queue 105A is operable to store packets received by network interface 104A and transmit queue 106A is operable to store packets that are to be transmitted by network interface 104A. Similarly, network interface 104B comprises (or is operatively coupled to) receive queue 105B and transmit queue 106B, where receive queue 105B is operable to store packets received by network interface 104B and transmit queue 106B is operable to store packets that are to be transmitted by network interface 104B.

According to the techniques described herein, network element 102 also comprises API logic 110 and storage area 112, which is configurable to store the forwarding information recorded by forwarding logic components 108. API logic 110 is a set of software and/or hardware components that are operable to receive address information identifying a packet flow and to provide in response forwarding information associated with that packet flow. In various embodiments, API logic 110 may be implemented as one or more software components that are executable by one or more processors, as one or more hardware components such as ASICs, or as any combination of one or more software and hardware components. API logic 110 is communicatively or operatively coupled and has access to the receive queues of the network interfaces of network element 102 and to storage area 112.

Storage area 112 may be implemented in one or more computer-readable media as one or more shared data structures. For example, storage area 112 may be implemented in volatile memory as one or more data structures (e.g., tables, arrays, linked lists of data items, etc.) in one or more shared memory regions that are accessible for reading and writing by forwarding logic components 108 and at least for reading by API logic 110. In another example, storage area 112 may be implemented in persistent storage such as non-volatile memory or a hard disk. In yet another example, storage area 112 may be implemented as shared data structures created and initialized in any combination of volatile memory and persistent storage.

Forwarding logic components 108 may comprise one or more components that are operable to make forwarding decisions for packets received at network element 102. Ellipses 108n indicates that forwarding logic components 108 may include any number of components, such as components 108A, 108B, and 108C. Depending on the operational context in which network element 102 is configured, different sets of forwarding logic components 108 may be participate in processing different types of packet flows. For example, one set of one or more forwarding logic components may participate in forwarding a pure IPv4 packet flow, and a different set of one or more forwarding logic components may participate in forwarding an MPLS-over-IP packet flow that carries Virtual Private Network (VPN) data.

Each component of forwarding logic components 108 may be implemented as a set of software and/or hardware modules that are operable to process and make forwarding decisions for packets received at the network interfaces of network element 102. In various embodiments, each component of forwarding logic components 108 may be implemented as one or more software modules that are executable by one or more processors, as one or more hardware modules such as ASICs, or as any combination of one or more software and hardware modules. For example, in some embodiments a forwarding logic component may be implemented as a software module that is operable to make a forwarding decision for a packet based on the packet header information (e.g., source address, destination address, source port, destination port, etc.) and on routing information that is maintained at network element 102 in various memory tables such as PLU tables and TLU tables. In other embodiments, a forwarding logic component may be implemented as a packet-switching ASIC that is operable to make a forwarding decision for a packet by examining routing information that is stored in memory tables or in TCAM memory.

In some embodiments, forwarding logic components 108 may include one or more components that are operable to check whether a packet conforms to one or more policies that are configured at network element 102 as part of Policy-Based Routing (PBR). The one or more policies may be encoded in one or more computer-readable media such as memory tables and TCAM memory. PBR provides a mechanism for expressing and implementing forwarding/routing of packets based on policies defined by network administrators. PBR provides a more flexible mechanism for routing packets through network elements by complementing the existing forwarding/routing mechanisms provided by routing protocols. When configured for PBR, network elements forward packets to the destination addresses based on information from static routes or dynamic routing protocols such as Routing Information Protocol (RIP), Open Shortest Path First (OSPF), or Enhanced Interior Gateway Routing Protocol (Enhanced IGRP®). Instead of routing by the destination address, PBR allows network administrators to determine and implement routing policies to allow or deny paths based on one or more of the following: identity of a particular end system, identity of an application program, type of protocol, and size of packets. PBR policies may also include, or may be augmented by, access policies that are specified in one or more ACLs. PBR policies are typically applied to incoming packets that are received on network interface with policy-based routing enabled. A PBR forwarding logic component of a network element processes the incoming packets against the entries in packet filters called route maps, where a route map entry encodes a policy as one or more statements that contain a combination of match conditions and set clauses/commands. Based on the criteria defined in the route maps, the PBR forwarding component determines the appropriate outgoing network interface for the incoming packets and causes these packets to be transferred to that outgoing network interface.

In some embodiments, forwarding logic components 108 may include one or more components that are operable to forward packets to a next-hop network element based on Multi-Topology Routing (MTR) routing information. MTR allows the configuration of service differentiation through class-based forwarding. MTR supports multiple unicast topologies and a separate multicast topology. A topology is a subset of the underlying network (or base topology) characterized by an independent set of Network Layer Reachability Information (NLRI). A particular topology may overlap with another topology and/or may share any subset of the underlying network. MTR provides separate forwarding capabilities on a per topology basis. A separate forwarding table may be maintained for each topology, which allows the application of independent forwarding configurations or the addition of a level of granularity to independent forwarding configurations. MTR can be used, for example, to define separate topologies for voice, video, and data traffic classes.

In operation, forwarding logic components 108 examine (in parallel or sequentially) packets that are received and stored in the receive queues of the network interfaces of network element 102. Based on information from the packets and on routing information stored and maintained at network element 102, forwarding logic components 108 determine to which outgoing network interface of network element 102 to transfer the packets, and cause the transfer of the packets to the transmit queue of that outgoing network interface.

According to the techniques described herein, each of forwarding logic components 108 is operable to determine whether it is processing a normal or a synthetic packet. For example, a forwarding logic component is able to determine whether a packet header includes "debug" flag (which would indicate that the packet is a synthetic packet), or whether the packet is a normal packet that needs to be forwarded. When a forwarding logic component determines that it is processing a synthetic packet, the forwarding logic component records the forwarding decision it makes for that packet along with any other additional data that would be helpful in interpreting the forwarding decision being recorded.

In an operational example, suppose that a network administrator needs to troubleshoot a problem with the forwarding of packets of a particular packet flow. The network administrator would log into network element 102, and would issue a CLI command to API 110. The CLI command specifies address information that identifies the packet flow. In response to the command, API logic 110 creates and initializes a data structure in storage area 112 for storing forwarding information 114. Based on the received address information, API logic 110 determines the incoming network interface on which packets of the packet flow are received, for example, network interface 104A. API logic 110 generates a synthetic packet based on the address information, where the synthetic packet includes a "debug" flag in its header which indicates that forwarding decisions for this packet are to be recorded and that this packet is not to be forwarded to any next-hop network element. Apart from the "debug" flag, the synthetic packet has the same headers as the headers of other packets in the packet flow identified in the received address information. After generating the synthetic packet, API logic 110 writes this packet into the receive queue 105A of network interface 104A.

Thereafter, one or more of forwarding logic components 108 processes the synthetic packet as part of processing the packets stored in receive queue 105A of network interface 104A. According to the techniques described herein, each forwarding logic component examines the headers of the packets it processes to determine whether any packet includes a "debug" flag. When a forwarding logic component determines that a packet header includes a "debug" flag, the forwarding logic component records the forwarding decision that it makes for that packet. Thus, when a forwarding logic component processes the synthetic packet, the forwarding logic component would record any forwarding decision it makes into forwarding information 114 along with any additional routing and/or configuration data that would be helpful to interpret the forwarding decision being recorded.

The processing of the synthetic packets by forwarding logic components 108 may result in one of several outcomes. In one outcome, one or more of the forwarding logic components may determine that the synthetic packet must be dropped (for example, because the packet does not conform to one or more access policies); thus, in this outcome the synthetic packet would be dropped and would not be forwarded to an outgoing network interface of network element 102. In another outcome, the one or more forwarding logic components that process the synthetic packet would determine to which outgoing network interface of network element 102 to transfer the synthetic packet; thus, in this outcome the synthetic packet would be transferred to the transmit queue of that outgoing network interface (for example, transmit queue 106B of network interface 104B). When placed in the transmit queue of outgoing network interface 104B, the synthetic packet would be examined and, based on the "debug" flag in the packet header, would be dropped prior to being transmitted to any next-hop network element. In either outcome, any forwarding decision made by any forwarding logic component would be recorded in forwarding information 114.

After forwarding logic components 114 have processed the synthetic packet and have recorded their respective forwarding decisions in forwarding information 114, API logic 110 retrieves forwarding information 114 from storage area 112 and provides the retrieved forwarding information 114 to the network administrator through the CLI. Since apart from being tagged as "debug" the synthetic packet has the same headers as any of the packets of the packet flow identified by the address information submitted by the network administrator, the forwarding decisions for the synthetic packet recorded in forwarding information 114 would be the same as the forwarding decisions made for the packets of the packet flow. As a result, the network administrator would be able to troubleshoot the problem with the forwarding of the packet flow by examining forwarding information 114.

4.2 Functional Details

Figure 2:
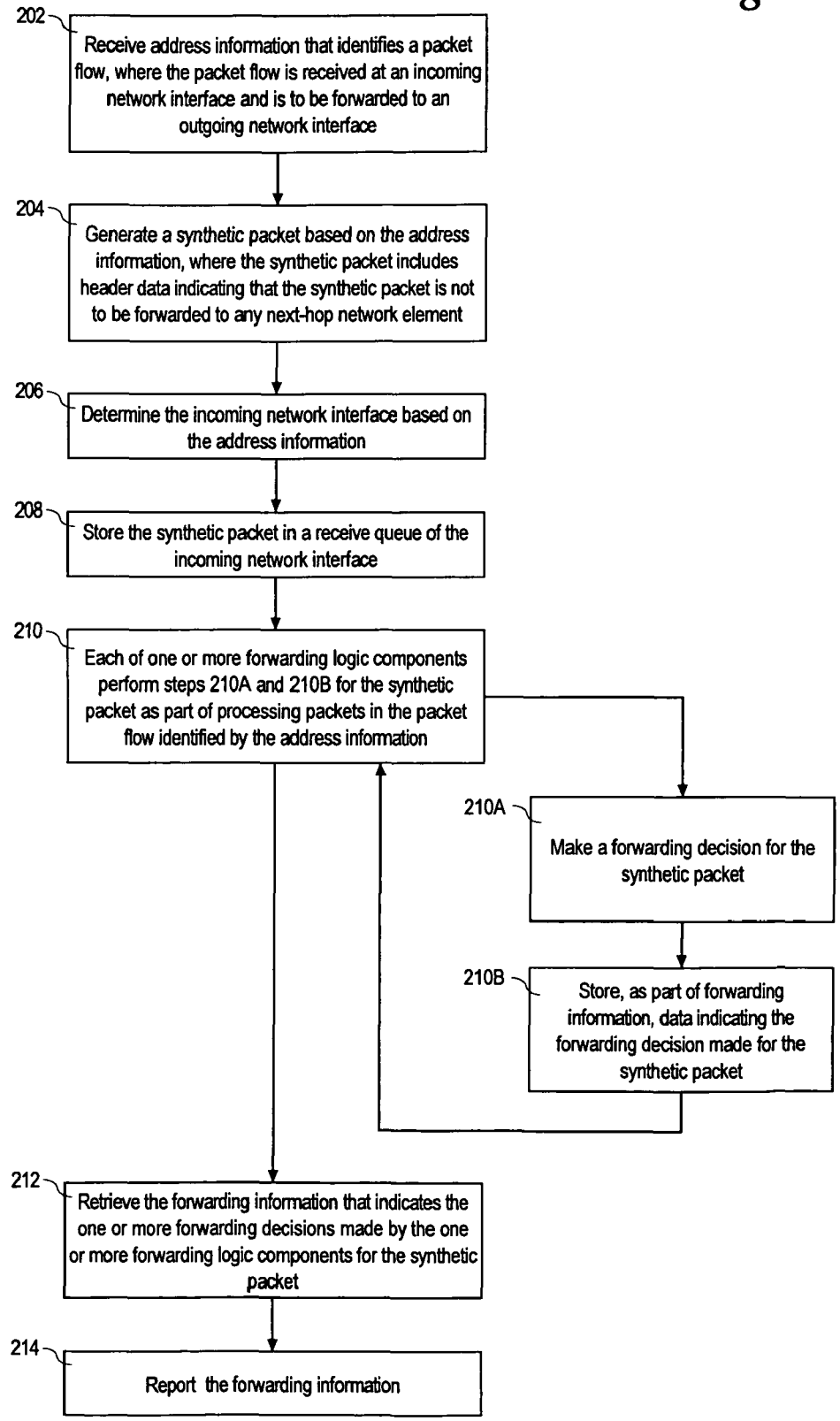
FIG. 2 illustrates an example method of obtaining information on forwarding decisions for packet flows according to one embodiment.

FIG. 2 illustrates an example method of obtaining information on forwarding decisions for packet flows according to one embodiment that uses synthetic packets.

In step 202, a network element or an API logic thereof receives address information that identifies a packet flow, where the packet flow is received at an incoming interface of the network element and is to be forwarded through an outgoing interface of the network element. For example, a network administrator may login to the network element (either locally or remotely) through a secure mechanism that provides sufficient authentication and authorization for accessing the network element. After login, the network administrator may issue a CLI command that includes the address information that identifies the packet flow. Alternatively, the network element may receive the address information from an automatic diagnostic tool that provides sufficient credentials to access the network element.

In step 204, a synthetic packet is generated at the network element based on the received address information. The synthetic packet includes header data which indicates that the synthetic packet is not to be forwarded to any next-hop network element and that any forwarding decisions made for the synthetic packet must be recorded. For example, the received address information may be a source address, a destination address, and an inbound MPLS label that identifies an MPLS-over-IP packet flow. The synthetic packet would be generated to include the source address, the destination address, and the inbound MPLS label. In addition, the header of the packet would include a "debug" flag to indicate that this is a synthetic packet.

In step 206, the network element or the API logic thereof determines the incoming network interface on which packets of the identified packet flow are received. For example, the incoming network interface may be determined by inspecting a memory table that associates inbound MPLS labels with network interface identifiers.

In step 208, the network element or the API logic thereof stores the synthetic packet in a receive queue of the incoming network interface.

Thereafter, in step 210 one or more forwarding logic components of the network element process the synthetic packet as part of processing packets of the identified packet flow that are stored in the receive queue of the incoming network interface. As part of processing the packets of the identified packet flow, the one or more forwarding logic components examine each packet to determine whether this packet is a synthetic packet the forwarding decisions for which must be recorded. Thus, when processing the synthetic packet, a forwarding logic component examines the header of the synthetic packet, finds the "debug" flag, and performs steps 210A and 210B. In step 210A, the forwarding logic component makes a forwarding decision for the synthetic packet and causes the synthetic packet to be transferred to an outgoing network interface of the network element. For example, a MTR forwarding logic component may use the inbound MPLS label to look up in a memory table a corresponding outbound MPLS label and an interface identifier of the outgoing network interface. The MTR forwarding logic component would then swap the inbound MPLS label in the packet with the determined outbound MPLS label, and would cause the synthetic packet to be transferred to the identified outgoing network interface. Then, in step 210B the MTR forwarding logic component would record the forwarding decision (e.g., the inbound MPLS label, the outbound MPLS label, and the interface identifier of outgoing network interface) for the synthetic packet in the forwarding information that is associated with, and being recorded for, the synthetic packet.

After the one or more forwarding logic components of the network element have processed the synthetic packet, in step 212 the network element or the API logic thereof retrieves the forwarding information that has been recorded for the synthetic packet. For example, the network element or the API logic thereof would retrieve the forwarding decision that was recorded by the MTR forwarding logic component.

In step 214, the network element or the API logic thereof reports the forwarding information recoded for the synthetic packet. Reporting the forwarding information may comprise providing the forwarding information to the entity that sent the address information identifying the packet flow. For example, the forwarding information including the forwarding decision made by the MTR forwarding logic component (e.g., inbound MPLS label, outbound MPLS label, interface identifier of outgoing network interface) may be provided through a CLI to a network administrator, or may be returned to automatic diagnostic tool.

In this manner, the techniques described herein provide for troubleshooting problems with the forwarding of a packet flow by a network element without raising any security concerns while at the same time providing detailed information that is sufficient to determine exactly what in the network element causes the forwarding problems. Depending on the operational context, the techniques described herein provide for returning forwarding information that can be specific to the type of packet flow being troubleshooted, including information used for making forwarding decisions from protocols in the layers of the communication stack that are different than the network layer.

5.0 Example Embodiment Using API Logic

According to the techniques described herein, in some embodiments a network element may determine the forwarding information for a packet flow by using logic that is operable to apply the same forwarding operations (and in the same order) that would be applied to packets of that packet flow that are actually received at the network element. Thus, in these embodiments the API logic is configured to make and store the same forwarding decisions as the forwarding decisions that would be made at the network element for the actual packets of the packet flow.

5.1 Structural Details

Figure 3:
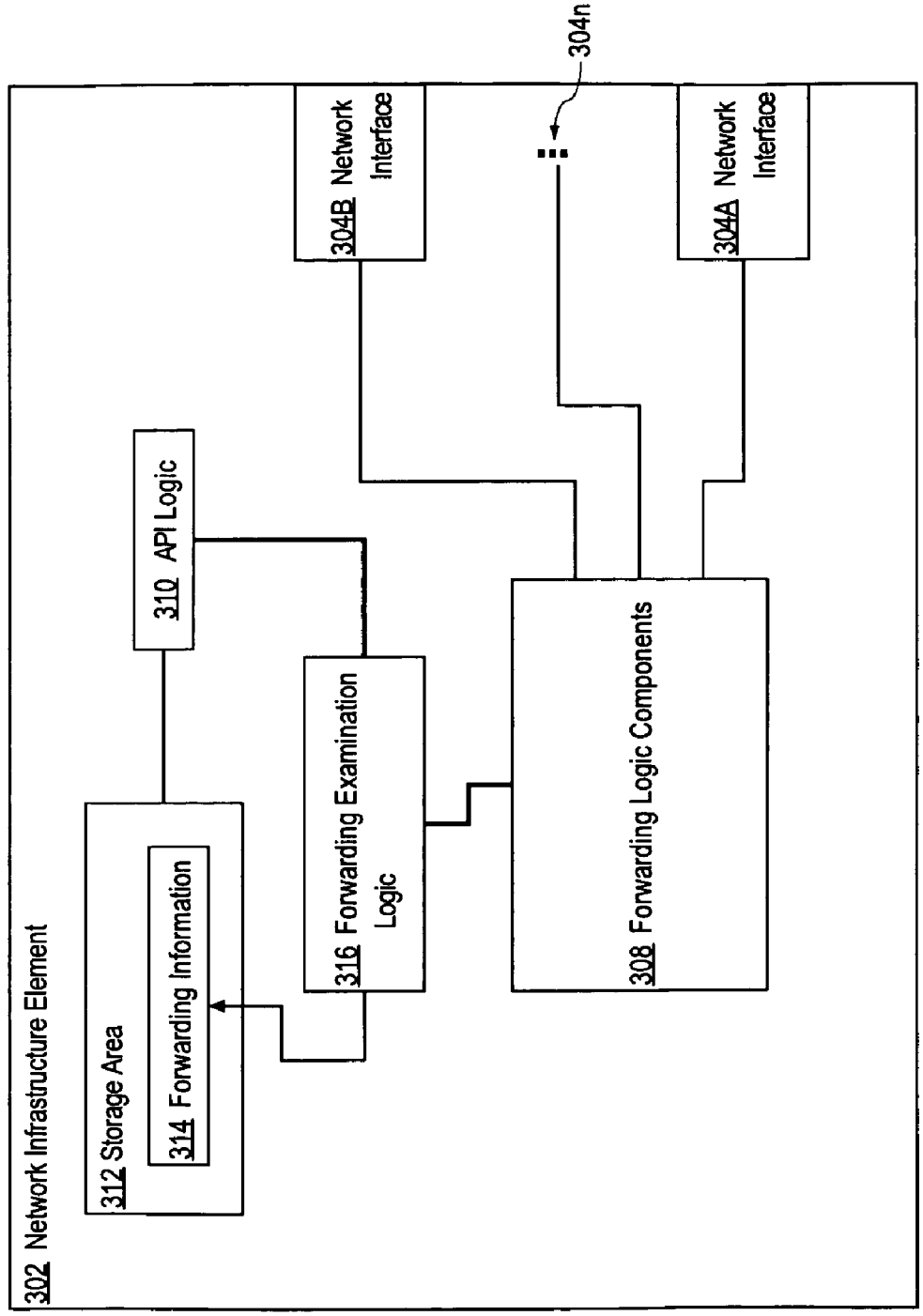
FIG. 3 illustrates an example network infrastructure element according to another embodiment.

FIG. 3 illustrates an example network element that is operable to implement the techniques described herein for obtaining information on forwarding decisions for packet flows according to one embodiment.

Network element 302 comprises a plurality of network interfaces 304n and forwarding logic components 308. Ellipses 304n indicates that network element 302 may comprise any number of network interfaces, such as network interfaces 304A and 304B.

According to the techniques described herein, network element 302 also comprises API logic 310, forwarding examination logic 316, and storage area 312 that is configurable to store the forwarding information recorded by forwarding examination logic 316. API logic 310 is a set of software and/or hardware components that are operable to receive address information identifying a packet flow and to provide in response forwarding information associated with that packet flow. In various embodiments, API logic 310 may be implemented as one or more software components that are executable by one or more processors, as one or more hardware components such as ASICs, or as any combination of one or more software and hardware components. API logic 310 is communicatively or operatively coupled to forwarding examination logic 316 and to storage area 112.

Storage area 312 may be implemented in one or more computer-readable media as one or more shared data structures. For example, storage area 312 may be implemented in volatile memory and/or in persistent storage as one or more shared data structures (e.g., tables, arrays, linked lists of data items, etc.) that are accessible for reading and writing by forwarding examination logic 316 and at least for reading by API logic 310.

Forwarding logic components 308 may comprise one or more components that are operable to make forwarding decisions for packets received at network element 302. Forwarding logic components 308 may be implemented as a set of software and/or hardware modules that are operable to process and make forwarding decisions for packets received at the network interfaces of network element 302. In various embodiments, forwarding logic components 308 may be implemented as one or more software modules that are executable by one or more processors, as one or more hardware modules such as ASICs, or as any combination of one or more software and hardware modules. For example, in some embodiments forwarding logic components 308 may be implemented as a software module that is operable to make a forwarding decision for a packet based on the packet header information (e.g., source address, destination address, source port, destination port, etc.) and on routing information that is maintained at network element 302 in various memory tables such as PLU tables and TLU tables. In other embodiments, forwarding logic components 308 may be implemented as a packet-switching ASIC that is operable to make a forwarding decision for a packet by examining routing information that is stored in memory tables or in TCAM memory. In some embodiments, forwarding logic components 308 may include one or more components that are operable to check whether a packet conforms to one or more policies that are configured at network element 302 as part of Policy-Based Routing (PBR). In some embodiments, forwarding logic components 308 may include one or more components that are operable to forward packets to a next-hop network element based on Multi-Topology Routing (MTR) routing information.

Forwarding examination logic 316 is communicatively and/or operatively coupled to API logic 310 and to storage area 312. According to the techniques described herein, forwarding examination logic 316 is a set of software and/or hardware components that are operable to perform (or to mimic the performance of) all forwarding operations that are performed by forwarding logic components 308 for packets that are actually received at the network interfaces of network element 302. In various embodiments, forwarding examination logic 316 may be implemented as one or more software components that are executable by one or more processors, as one or more hardware components such as ASICs, or as any combination of one or more software and hardware components. For example, in some embodiments forwarding examination logic 316 and forwarding logic components 308 may be implemented as a set of software modules. In these embodiments, according to the techniques described herein forwarding examination logic 316 may be operable to invoke any functions and procedures provided by forwarding logic components 308. In another example, forwarding examination logic 316 and forwarding logic components 308 may be implemented as a set of ASICs. In these embodiments, according to the techniques described herein forwarding examination logic 316 may be operable to provide input to, and to receive output from, forwarding logic components 308. In yet another example, forwarding examination logic 316 may be implemented as a set of software and/or hardware components that are operable to make forwarding decisions independently from forwarding logic components 308 based on the address information received from API logic 310 and on the same routing information and other internal structures that are used by forwarding logic components 308. Thus, forwarding examination logic 316 is not limited to being implemented by any particular mechanism, and for this reason the implementation examples of forwarding examination logic 316 provided herein are to be regarded in an illustrative rather than a restrictive sense.

According to the techniques described herein, forwarding examination logic 316 is operable to receive from API logic 310 address information that identifies a packet flow that is received at and forwarded by network element 302. For example, API logic 310 may be operable to invoke a function provided by forwarding examination logic 316 and to pass the address information as input parameters of the function. Forwarding examination logic 316 is operable perform the same operations and in the same order as the operations that would be performed by forwarding logic components 308 for a packet of the identified packet flow that is received at and processed by network element 302. Further, according to the techniques described herein forwarding examination logic 316 is operable to record in storage area 312 any forwarding decisions that it determines for the address information received from API logic 310. For example, based on the address information, forwarding examination logic 316 would inspect the same routing information tables, security policies, QoS policies, and other internal structures used in the process of forwarding packets, and in the same order, as forwarding logic components 308 would for any packet of the packet flow identified in the address information. As a result, the forwarding examination logic 316 would make exactly the same forwarding decisions as the forwarding decisions that would be made by forwarding logic components 308 for packets of the packet flow that is identified by the address information received from API logic 310.

In an operational example, suppose that a network administrator needs to troubleshoot a problem with the forwarding of packets of a particular packet flow. The network administrator would log into network element 302, and would issue a CLI command to API 310. The CLI command specifies address information that identifies the packet flow. In response to the command, API logic 310 creates and initializes a data structure in storage area 112 for storing forwarding information 114, and invokes or otherwise passes the address information to forwarding examination logic 316. Based on the address information, forwarding examination logic 316 performs the same forwarding operations that would be performed by forwarding logic components 308 for a packet of the packet flow that is actually received at a network interface of network element 302. As a result, forwarding examination logic 316 makes the same forwarding decisions for the received address information as the forwarding decisions that would be made by forwarding logic components 308 for the packets of the packet flow. At each step during the process of making the forwarding decisions, forwarding examination logic 316 records the forwarding decisions it makes in forwarding information 314. In addition, forwarding examination logic 316 may also store in forwarding information 314 any routing and/or configuration data that would be helpful to interpret each forwarding decision being recorded.

After the forwarding decisions have been stored in forwarding information 314, forwarding examination logic 316 may notify API logic 310 accordingly. API logic 310 retrieves forwarding information 314 from storage area 312 and provides the retrieved forwarding information 314 to the network administrator through the CLI. Notably, the forwarding decisions stored in forwarding information 314 are the same as the forwarding decisions that would be made by forwarding logic components 308 for the packets of the packet flow identified by the address information submitted by the network administrator. As a result, the network administrator would be able to troubleshoot the problem with the forwarding of the packet flow by examining forwarding information 314.

5.2 Functional Details

Figure 4:
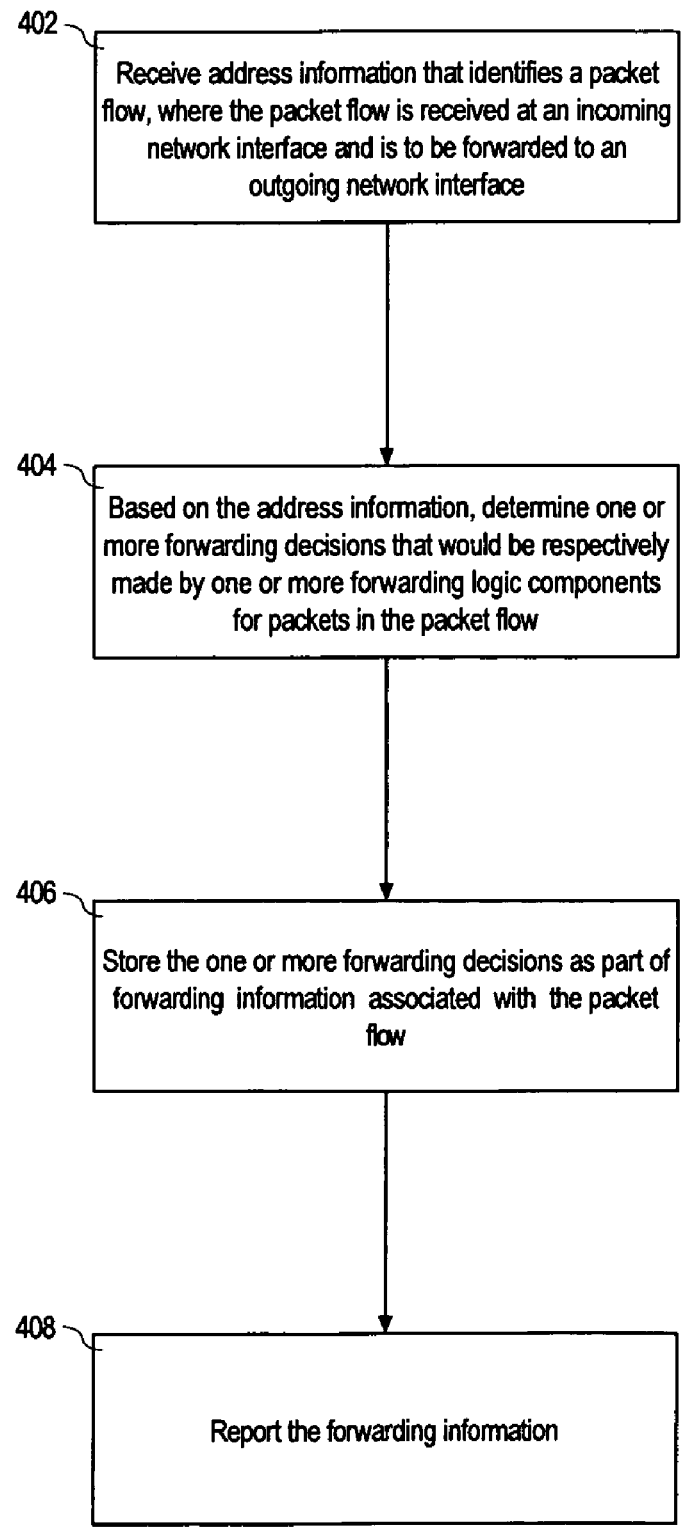
FIG. 4 illustrates an example method of obtaining information on forwarding decisions for packet flows according to another embodiment.

FIG. 4 illustrates an example method of obtaining information on forwarding decisions for a packet flow according to one embodiment that uses logic that is operable to make the same forwarding decisions that would be made for packets of that packet flow that are actually received at the network element.

In step 402, a network element or a component thereof receives address information that identifies a packet flow, where the packet flow is received at an incoming interface of the network element and is to be forwarded through an outgoing interface of the network element. For example, a network administrator may login at the network element (either locally or remotely) and may issue a CLI command that includes the address information that identifies the packet flow. Alternatively, the network element may receive the address information from an automatic diagnostic tool that provides sufficient credentials to access the network element.

In step 404, based on the address information and on routing information maintained at the network element, a forwarding examination logic of the network element determines one or more forwarding decisions that would be respectively made by one or more forwarding logic components of the network element for packets of the identified packet flow that are actually received at an incoming network interface of the network element. For example, the address information may identify a packet flow by including a source address, a destination address, a source port, and a destination port. In this example, the forwarding examination logic would make a forwarding decision for the packet flow based on the received source address, destination address, source port, and destination port. The forwarding decision may be a determination to drop packets of the packet flow identified by the received source address, destination address, source port, and destination port. Alternatively, the forwarding decision may be a determination of an outgoing network interface of the network element through which packets of the identified packet flow are to be transmitted to a next-hop network element. In any case, the forwarding decision made by the forwarding examination component for the received address information is the same as the forwarding decision that would be made by the forwarding logic components of the network element for an actual packet of the identified packet flow.

In step 406, the one or more forwarding decisions made by the forwarding examination logic are stored as part of forwarding information that is associated with the packet flow identified by the received address information. After the one or more forwarding decisions are stored as part of the forwarding information, in step 408 the network element or a component thereof retrieves the forwarding information.

In step 408, the network element or the component thereof reports the forwarding information. For example, the forwarding information may be returned through a CLI to a network administrator that provided the address information. Since the forwarding information includes the same forwarding decisions that would be made by the network element for the actual packets of the identified packet flow, the network administrator would be able to troubleshoot any problems with the forwarding of the packet flow by examining the returned forwarding information. Alternatively, the network element or the component thereof may return the forwarding information to an automatic diagnostic tool for analysis.

In this manner, the techniques described herein provide for troubleshooting problems with the forwarding of a packet flow by a network element without raising any security concerns or issues. In addition, depending on the operational context, the techniques described herein provide for returning forwarding information that can be specific to the type of packet flow being troubleshooted and that is sufficient to determine exactly what in a network element causes the forwarding problems.

6.0 Implementation Mechanisms—Hardware Overview

Figure 5:
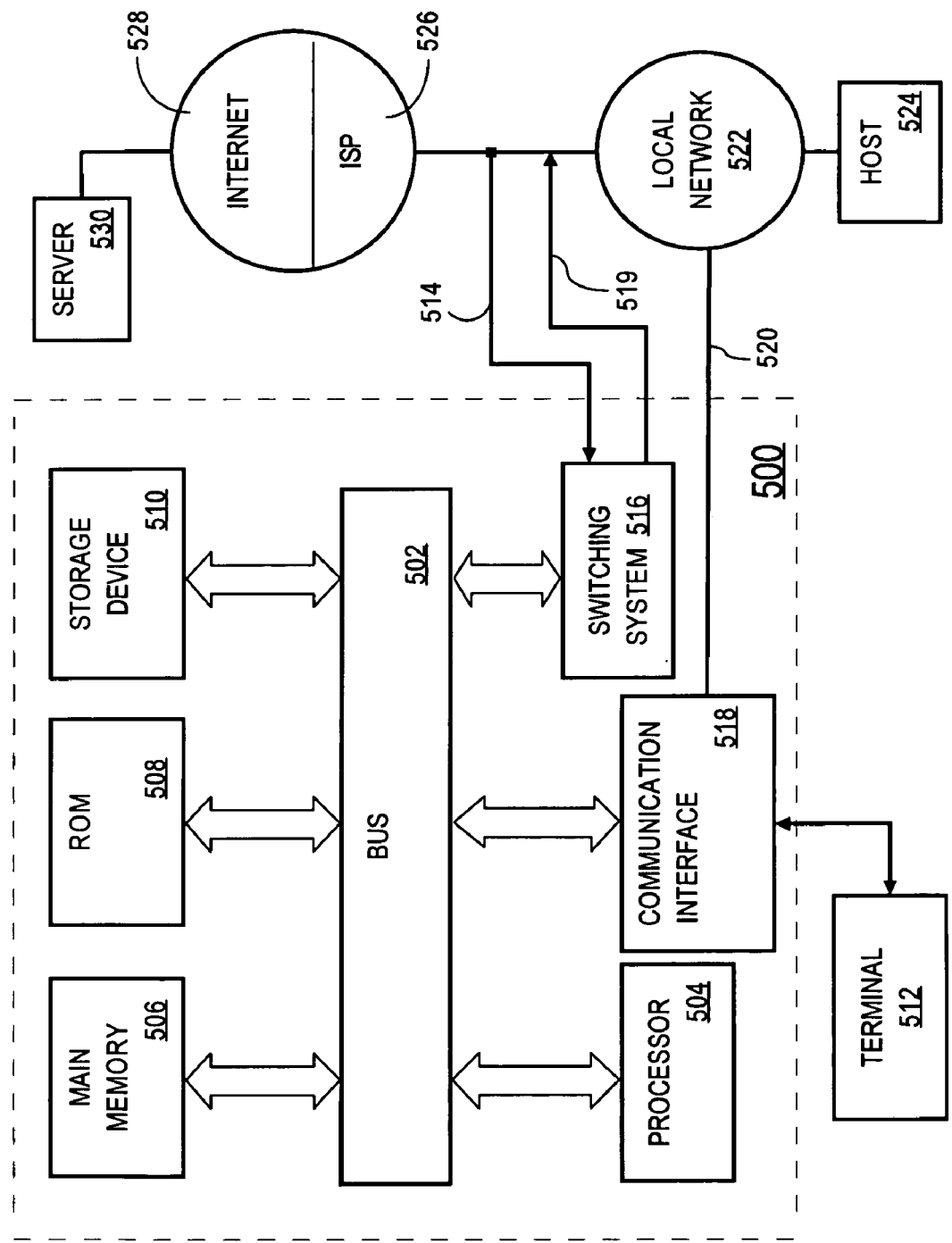
FIG. 5 illustrates a computer system.

FIG. 5 is a block diagram that illustrates a computer system 500 upon which an embodiment of the techniques described herein may be implemented. Example embodiments may be implemented using one or more computer programs and/or one or more ASICs that are executable on a network infrastructure element such as a router or switch. Thus, in one embodiment the computer system 500 is a router. In some embodiments, the techniques described herein may be implemented on a line card that is coupled as a blade to the backplane of a router in which one or more Route Processors (RPs) and multiple line cards are coupled over a crossbar switch fabric. In these embodiments, each line card is a computer system that includes its own network interface(s), processor(s), and ASIC(s), and is capable of independently forwarding inbound packets by switching the packets to an outgoing interface of the same line card and/or by switching the packets across the crossbar switch fabric to a different line card of the router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for obtaining information on forwarding decisions for packet flows. According to one embodiment, obtaining information on forwarding decisions for packet flows is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operate in a specific fashion. In an embodiment implemented using computer system 500, various computer-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire, and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine such as, for example, a computer system.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application program provides for obtaining information on forwarding decisions for packet flows as described herein.

The received code may be executed by processor 504 as it is received, and/or stored in storage device 510, or other non-volatile storage for later execution. In this manner, computer system 500 may obtain application code in the form of a carrier wave.

7.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:
   a plurality of network interfaces that are operable to communicatively connect to one or more packet-switched networks;
   one or more forwarding logic components coupled to the plurality of network interfaces and operable to receive packet flows and to forward the packet flows;
   logic stored in one or more storage media for execution and when executed operable to:
      receive address information that identifies a packet flow;
      generate a synthetic packet based on the address information and comprising header data indicating that the synthetic packet is not to be forwarded to any next-hop network element;
      provide the synthetic packet to at least one forwarding logic component of the one or more forwarding logic components;
      retrieve forwarding information that indicates one or more forwarding decisions for the synthetic packet made by said at least one forwarding logic component; and
      report the forwarding information;
   wherein said at least one forwarding logic component is operable to:
      make a forwarding decision for the synthetic packet as part of processing packets in the packet flow; and
      store, as part of the forwarding information, data indicating the forwarding decision.

2. The apparatus of claim 1, wherein the apparatus is a router.

3. The apparatus of claim 1, wherein the one or more forwarding logic components comprise a Policy-Based Routing (PBR) component that is operable to determine whether the packets in the packet flow conform to one or more routing policies.

4. The apparatus of claim 1, wherein the one or more forwarding logic components comprise a Multi-Topology Routing (MTR) component that is operable to route the packets in the packet flow to a next-hop network element based on MTR routing information.

5. The apparatus of claim 1, wherein the forwarding decision made by said at least one forwarding logic component includes one or more of:
   dropping the synthetic packet;
   determining how the synthetic packet is to be treated within the apparatus; and
   determining a next-hop network element to which the synthetic packet is supposed to be forwarded.

6. The apparatus of claim 1, wherein said at least one forwarding logic component is further operable to:
   examine the synthetic packet; and
   based on the header data, determine that the data indicating the forwarding decision needs to be stored as part of the forwarding information.

7. The apparatus of claim 1, wherein:
   the logic is further operable to:
      create and initialize a data structure for storing the forwarding information, wherein the data structure is associated with the synthetic packet; and
      after said at least one forwarding logic components has recorded the forwarding information in the data structure, retrieve the forwarding information from the data structure; and
   said at least one forwarding logic component is further operable to store into the data structure the data indicating the forwarding decision made for the synthetic packet by said at least one forwarding logic component.

8. The apparatus of claim 1, wherein the logic operable to provide the synthetic packet to said at least one forwarding logic component further comprises logic which, when executed, is operable to:
   determine, based on the address information, an incoming network interface on which the packet flow is received; and
   store the synthetic packet in a receive queue of the incoming network interface.

9. The apparatus of claim 1, wherein the address information that identifies the packet flow comprises one or more of:
   a source address for the packets in the packet flow;
   a destination address for the packets in the packet flow;
   an identifier of a Layer 4 protocol associated with the packets in the packet flow;
   a source port for the packets in the packet flow;
   a destination port for the packets in the packet flow;
   an identifier of an application layer protocol associated with the packets in the packet flow;
   an identifier of an incoming network interface on which the packets in the packet flow are received; and
   one or more protocol options for one or more protocols associated with the packets in the packet flow.

10. The apparatus of claim 1, wherein the forwarding information comprises one or more of:
    an identifier of an outgoing network interface through which the packets in the packet flow are forwarded;
    one or more metrics associated with a network route over which the packets in the packet flow are forwarded;
    one or more network addresses of one or more next-hop network elements to which the packets in the packet flow are forwarded;
    one or more Layer 2 addresses of one or more next-hop network elements to which the packets in the packet flow are forwarded;
    one or more Layer 2 tags associated with the packets in the packet flow; and
    rewrite data that is used to overwrite Layer 2 or Layer 3 headers of the packets in the packet flow.

11. An apparatus comprising:
    a plurality of network interfaces that are operable to communicatively connect to one or more packet-switched networks;
    one or more forwarding logic components coupled to the plurality of network interfaces and operable to receive packet flows and to forward the packet flows;
    logic stored in one or more storage media for execution and when executed operable to:
       receive address information that identifies a packet flow;
       based on the address information, determine one or more forwarding decisions that would be respectively made by the one or more forwarding logic components for packets in the packet flow;

wherein, to determine the one or more forwarding decisions, the logic is configured to perform, based on the address information, all forwarding operations that are performed by the one or more forwarding logic components for the packets in the packet flow that are actually received at one or more of the plurality of network interfaces;

store the one or more forwarding decisions as part of forwarding information associated with the packet flow; and report the forwarding information.

12. The apparatus of claim 11, wherein the apparatus is a router.

13. The apparatus of claim 11, wherein the one or more forwarding logic components comprise a Policy-Based Routing (PBR) component that is operable to determine whether the packets in the packet flow conform to one or more routing policies.

14. The apparatus of claim 11, wherein the one or more forwarding logic components comprise a Multi-Topology Routing (MTR) component that is operable to route the packets in the packet flow to a next-hop network element based on MTR routing information.

15. The apparatus of claim 11, wherein the one or more forwarding decisions that would be respectively made by the one or more forwarding logic components include one or more of:

dropping the packets in the packet flow;

determining how the packets in the packet flow are to be treated within the apparatus; and determining a next-hop network element to which the packets in the packet flow are to be forwarded.

16. The apparatus of claim 11, wherein the logic is further operable to store the forwarding information in a data structure that is associated with the packet flow.

17. The apparatus of claim 11, wherein the address information that identifies the packet flow comprises one or more of:

a source address for the packets in the packet flow;

a destination address for the packets in the packet flow;

an identifier of a Layer 4 protocol associated with the packets in the packet flow;

a source port for the packets in the packet flow;

a destination port for the packets in the packet flow;

an identifier of an application layer protocol associated with the packets in the packet flow;

an identifier of an incoming network interface on which the packets in the packet flow are received; and one or more protocol options for one or more protocols associated with the packets in the packet flow.

18. The apparatus of claim 11, wherein the forwarding information comprises one or more of:

an identifier of an outgoing network interface through which the packets in the packet flow are forwarded;

one or more metrics associated with a network route over which the packets in the packet flow are forwarded;

one or more network addresses of one or more next-hop network elements to which the packets in the packet flow are forwarded;

one or more Layer 2 addresses of one or more next-hop network elements to which the packets in the packet flow are forwarded;

one or more Layer 2 tags associated with the packets in the packet flow; and rewrite data that is used to overwrite Layer 2 or Layer 3 headers of the packets in the packet flow.

19. A computer-implemented method comprising:

at a network element, receiving address information that identifies a packet flow;

wherein the network element comprises:

a plurality of network interfaces that are communicatively connected to one or more packet-switched networks; and one or more forwarding logic components coupled to the plurality of network interfaces and operable to receive packet flows and to forward the packet flows;

generating a synthetic packet based on the address information and comprising header data indicating that the synthetic packet is not to be forwarded to any next-hop network element;

providing the synthetic packet to at least one forwarding logic component of the one or more forwarding logic components;

said at least one forwarding logic component processing packets in the packet flow, wherein said at least one forwarding logic component processing the packets in the packet flow comprises:

making a forwarding decision for the synthetic packet; and storing, as part of forwarding information, data indicating the forwarding decision;

at the network element, reporting the forwarding information.

20. The method of claim 19, wherein the network element is a router.

21. The method of claim 19, wherein said at least one forwarding logic component processing the packets in the packet flow further comprises:

examining the synthetic packet; and based on the header data, determining that the data indicating the forwarding decision needs to be stored as part of the forwarding information.

22. The method of claim 19, wherein providing the synthetic packet to said at least one forwarding logic component further comprises:

determining, based on the address information, an incoming network interface on which the packet flow is received; and storing the synthetic packet in a receive queue of the incoming network interface.

23. A computer-implemented method comprising:

at a network element, receiving address information that identifies a packet flow;

wherein the network element comprises:

a plurality of network interfaces that are communicatively connected to one or more packet-switched networks; and one or more forwarding logic components coupled to the plurality of network interfaces and operable to receive packet flows and to forward the packet flows;

based on the address information, determining one or more forwarding decisions that would be respectively made by the one or more forwarding logic components for packets in the packet flow;

wherein determining the one or more forwarding decisions comprises performing, based on the address information, all forwarding operations that are performed by the one or more forwarding logic components for the packets in the packet flow that are actually received at one or more of the plurality of network interfaces;

storing the one or more forwarding decisions as part of forwarding information associated with the packet flow; and at the network element, reporting the forwarding information.

24. The method of claim 23, wherein the network element is a router.

25. The method of claim 23, wherein the one or more forwarding decisions that would be respectively made by the one or more forwarding logic components include one or more of:

dropping the packets in the packet flow;

determining how the packets in the packet flow are to be treated within the network element; and determining a next-hop network element to which the packets in the packet flow are to be forwarded.

26. The method of claim 23, wherein storing the one or more forwarding decisions as part of the forwarding information further comprises storing the forwarding information in a data structure that is associated with the packet flow.

* * * * *